United States Patent
Zhang

(10) Patent No.: US 7,187,719 B2
(45) Date of Patent: Mar. 6, 2007

(54) METHOD AND SYSTEM FOR DATA RATE OPTIMIZATION IN A DIGITAL COMMUNICATION SYSTEM

(75) Inventor: Xuming Zhang, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 765 days.

(21) Appl. No.: 10/465,011

(22) Filed: Jun. 18, 2003

(65) Prior Publication Data

US 2004/0258172 A1 Dec. 23, 2004

(51) Int. Cl.
*H04L 5/12* (2006.01)
*H04B 3/20* (2006.01)

(52) U.S. Cl. ............................ 375/261; 370/286
(58) Field of Classification Search ............... 375/261, 375/346, 227, 219, 231; 370/286; 379/406.01; 704/226, 228
See application file for complete search history.

(56) References Cited

U.S. PATENT DOCUMENTS

| 6,564,184 B1 * | 5/2003 | Eriksson ..................... 704/226 |
| 6,934,345 B2 * | 8/2005 | Chu et al. ................... 375/346 |
| 2003/0099208 A1 * | 5/2003 | Graziano et al. ........... 370/286 |

\* cited by examiner

*Primary Examiner*—Khai Tran
(74) *Attorney, Agent, or Firm*—Weide & Miller, Ltd.

(57) ABSTRACT

A method and for optimizing bit rate throughput in a digital communication system is provided. The method includes establishing a relationship between signal to noise ratio and plural symbol rates for a particular constellation size. The method also includes determining noise power spectral density (N(f)), wherein N(f) is determined during a silent period of line probing; determining $X_k(f)$, wherein $X_k(f)$ is determined by turning on a remote station transmit signal, after N(f) has been measured and determining residual echo $E_k(f)$, wherein $E_k(f)$ is determined by turning on a central station echo canceller.

23 Claims, 10 Drawing Sheets

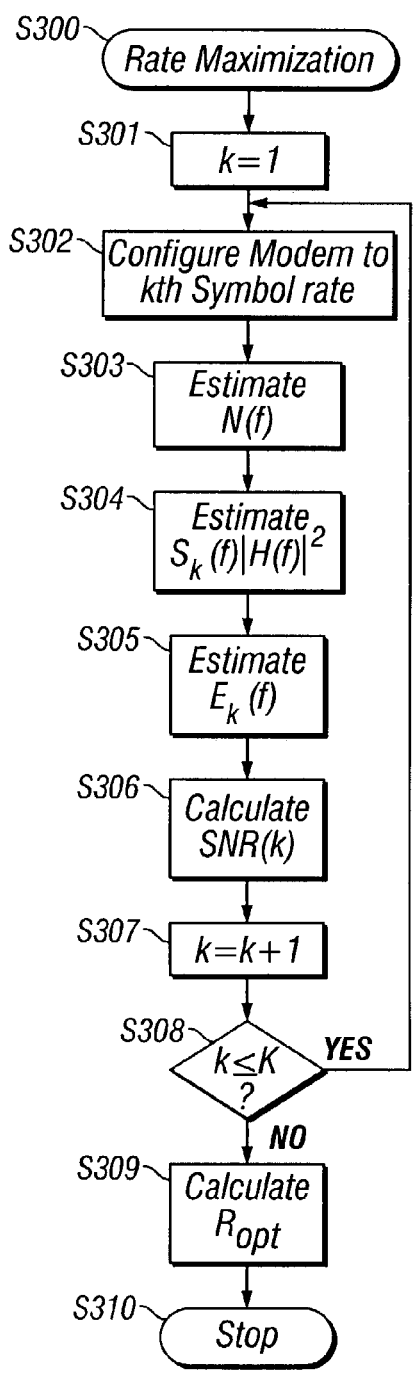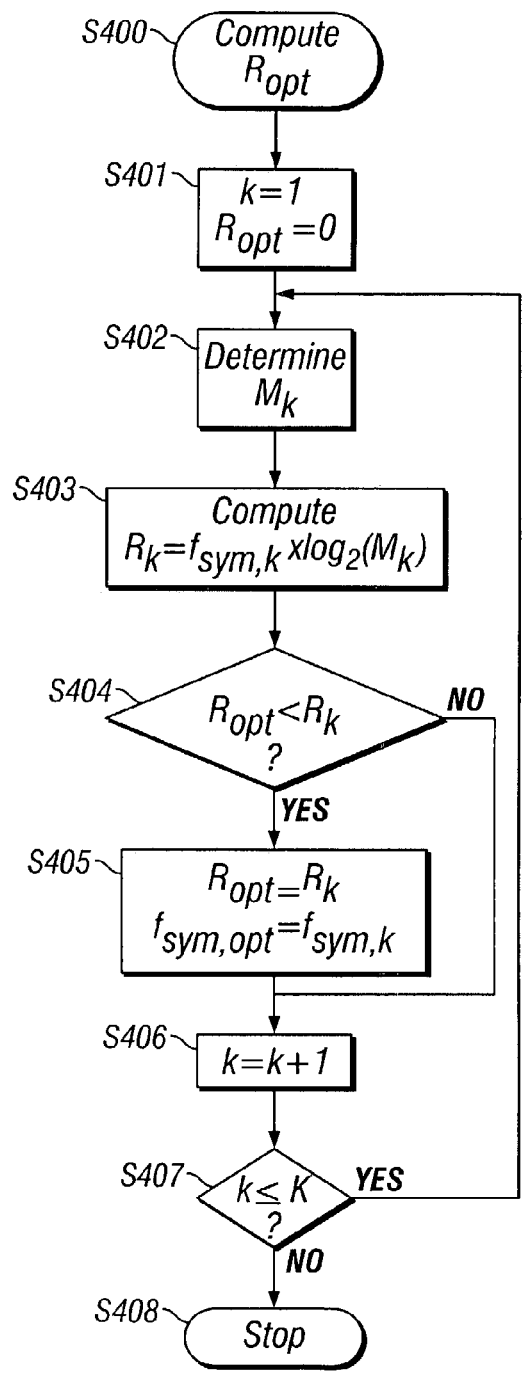
FIG. 3
FIG. 4

METHOD AND SYSTEM FOR DATA RATE OPTIMIZATION IN A DIGITAL COMMUNICATION SYSTEM

BACKGROUND OF THE INVENTION

1. Field of the Invention

The present invention relates to communication systems, and more particularly to data rate optimization in a communication system.

2. Background

Various technologies have been developed, such as Digital Subscriber Line (DSL) technology, to provide high data rates over ordinary twisted pair lines. Numerous various standards are currently used for transferring data over twisted pair lines.

One such standard is V.90 (with a later version called V.92) published by the International Telecommunication Union ("ITU"), incorporated herein by reference in its entirety. The V.90/V.92 standard defines the operation of a digital and analog modem for data transmission in a digital communication system. The V.90/V.92 standard uses M-ary Pulse Amplitude Modulation ("PAM") that samples signals at fixed intervals. Typically, a binary input stream is subdivided into block of k bits called symbols and each symbol is represented by a pulse amplitude value with M possible levels where M is the number of points in a signal constellation or constellation size.

In the V.90/V.92 standard, the symbol rate is restricted by G.711 PCM codec analog/digital (A/D) sampling rate, which is typically 8 kHz. In order to get a high bit rate (or data rate) a large constellation size per symbol is required. In PAM systems, every extra bit per symbol requires more power than in Quadrature Amplitude Modulation (QAM) systems. For example to double the data rate without increasing bandwidth (symbol rate), the constellation size increases from M to $M^2$ and energy per bit ($E_b$) will increase from $E_b$ to $E_b = (M^2+1)E_b/2$ Another standard in the DSL arena is "G.shdsl" or G.992.1, published by ITU and incorporated herein by reference in its entirety. G.shdsl digitally uses Trellis Coded Pulse Amplitude Modulation (TC-PAM) scheme with lower band of frequencies to achieve high performance range while maintaining the ability to symmetrically transmit voice or data.

In G.shdsl, the constellation size is fixed (16-TCM-PAM) and variable bit rates are achieved by varying the symbol rate. For a flat to mild amplitude distortion, if symbol rate is unlimited, the bit error probability is given by Pe, where $$P_e = 0.5 Q\left(\sqrt{\frac{2E_b}{N_0}}\right)$$

which is independent of data and the consumed bandwidth, and where $$Q(x) = \frac{1}{\sqrt{2\pi}} \int_x^\infty e^{-t^2/2} dt$$

is the Q-function. However, signal power must increase linearly with data rates to maintain constant energy per bit ($E_b$)

For channels such as DSL that are distorted or attenuated as a function of frequency, the trade off between symbol rate and increasing the number of levels (i.e. increasing the constellation size), must be optimized in order to fully utilize channel capacity. In a DSL environment, cross talk from adjacent pairs in the same bundle increases with frequency. Conventional systems (i.e. ITU V.90/V.92 or G.992.1) do not allow the simultaneous choice of optimizing constellation size and symbol rates to achieve maximum throughput in data rate(s).

Therefore, there is a need for a system and method for maximizing data rate by selecting proper constellation size with a matching symbol rate for available bandwidth and average power constraint, such that each channel determines the optimal setting for constellation size and symbol rate.

SUMMARY OF THE INVENTION

In one aspect of the present invention a method for optimizing data rate in a digital communication system is provided. In one embodiment the method and apparatus disclosed herein establishes a relationship between one or more parameters of system operation. In one embodiment these parameters comprise signal to noise ratio and plural symbol rates for a particular constellation size. Thus, in one embodiment the system may enter a training phase during transmission occurs utilizing permutations of one or more symbol rates and one or more sizes for the constellation or mappings scheme. During this phase one or more system parameters are monitored and/or recorded, such as the signal to noise ratio (SNR) and the overall bit transmission rate. Based on the results of the training phase and optimal symbol rate and constellation size are determined. These values may fall within desired transmit power levels. Also contemplated are modifications to the type of encoding scheme that is utilized, the modulation scheme, or the equalization strategy.

As advantages over prior art, the method and apparatus disclosed herein allows an optimal symbol rate and optimal constellation size to be determined and utilized during a communication session. Other settings may also be optimized through the training process. These optimal settings may be selected to maximize the signal to noise ratio, minimize signal transmit power, maximize bit transfer rate, reduce echo or crosstalk, minimize bit error rate, simplify implementation complexity, or any other aspect of system operation. Through use of these optimal settings, communication system operation is improved or enabled.

Another advantage is that the symbol rate and optimal constellation size are calculated for the actual installed communication(s) devices utilizing the actual channel over which data will be transmitted. By establishment of the communication system operational parameters using the actual installed system over the actual channel to be used, the most accurate operational parameters may be established. Prior art systems select and fix the symbol rate or constellation size at the time of design suffer from being limited to a predetermined particular setting when other settings may be preferable.

Yet another advantage of the method and apparatus described herein is it in one embodiment the constellation size and symbol rate may be set by with guidance from a technician or to follow certain guidelines. This allows other than the optimal settings to be utilized but with emphasis with other parameters. Hence it is contemplated that a technician may control or limit one or more operational parameters of the communication device to achieve desired operation. For example, the frequency of operation may be reduced, to prevent or reduce crosstalk yet all other parameters, such as transmit power and constellation size optimized. It is contemplated that any variable discussed herein may be controlled while one or more other parameters are optimized.

In one embodiment the method disclosed herein may also comprise determining noise power spectral density (N (f)), wherein N(f) is determined during a silent period of line probing; determining a factor $X_k(f)$ based on a nominal front end transmit signal power spectral density for a $k^{th}$ symbol rate and an ideal loop gain function of a channel after N(f) has been measured, and determining residual echo $E_k(f)$ for a $k^{th}$ symbol rate, wherein $E_k(f)$ is determined by activating a central (local) station echo canceller.

In another aspect, a method for determining noise power spectral density (N(f)) and $X_k(f)$ for optimizing bit rate throughput in a digital communication system is provided. The method includes de-activating a remote signal; and measuring N(f). The method also includes activating the remote transmit signal; and measuring $X_k(f)$.

In yet another aspect, a method for determining residual echo $E_k(f)$ for optimizing bit rate throughput in a digital communication system is provided. The method includes, activating a local transmit signal; and activating a local echo canceller.

In another aspect of the present invention, a system for optimizing data rate in a digital communication system is provided. The system includes, a spectral analyzer, wherein the spectral analyzer measures noise power spectral density during a silent period of line probing; and an echo channel for measuring residual echo $E_k(f)$ for a $k^{th}$ symbol rate. The spectra analyzer also measures $X_k(f)$.

In one aspect of the present invention, a maximum bit rate is achieved utilizing an optimal symbol rate and constellation size without significant penalties in power.

In one embodiment, the process and apparatus disclosed herein is optimized to operate efficiently for both V.90/V.92 and G.shdsl standards.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures:

FIG. 3 shows a flow diagram of process steps for data rate maximization, according to one aspect of the present invention;

FIG. 4 shows a flow diagram of process steps for data rate maximization, according to one aspect of the present invention;

DETAILED DESCRIPTION OF THE PREFERRED EMBODIMENTS

Definitions: The following definitions are used in various aspects of the present invention and with respect to digital communication systems (but not exclusively):

"$\Delta f_{sym}$": Symbol rate increment;
"$f_{sym,k}$": Symbol rate for the $k^{th}$ allowable symbol rate;
"PSD": Power spectral density;
"BER": Bit Error Rate;
"DFE": Decision Feedback Equalizer;
"$E_k(f)$": Residual echo power spectral density for the $k^{th}$ symbol rate;
"$f_{sym-max}$": Maximum symbol rate;
"FFE": Fractionally Spaced Feed Forward Equalizer;
"H(f)": Ideal loop gain function;
"M": Constellation size;
"MSE DFE": Mean Square Error Decision Feedback Equalizer;
"PAM": Pulse Amplitude Modulation;
"N(f)": Noise power spectral density;
"R": Data rate ((No of bits/symbol)*symbol rate);
"STU-C": Transceiver unit at central office;
"STU-R": Transceiver unit at remote office;
"$S_k(f)$": Nominal front end transmit signal PSD for the $k^{th}$ symbol rate;
"SNR": Signal to Noise Ratio;
"$SNR_{dB}(k)$": Signal to Noise ratio function for the $k^{th}$ symbol rate; and
"TC-PAM": Trellis Coded Pulse Amplitude Modulation.

In general, a method and apparatus is disclosed herein for establishing optimal communication system settings. To facilitate an understanding of the preferred embodiment, the general architecture and operation of a communication system will be described first. The specific process under the preferred embodiment will then be described with reference to the general architecture.

Figure 13:
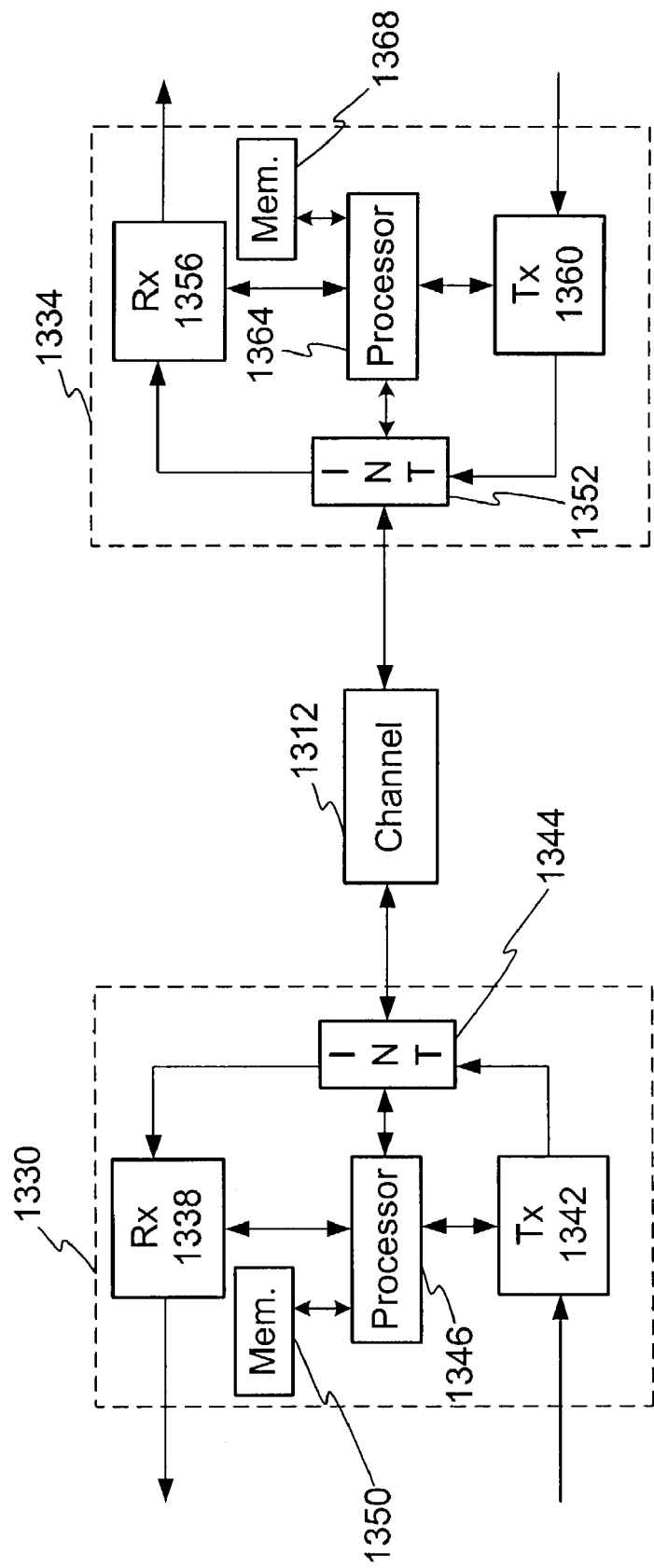
FIG. 13 shows an exemplary block diagram of an example embodiment of the invention.

FIG. 13 illustrates a block diagram of an example embodiment of a communication system configured in accordance with the teachings contained herein. The communication system may comprise any type communication system, including but not limited to, transmission systems over unshielded twisted-pair lines such as voice-band modems (V.90/V.92 modems), DSL transceivers (G.shdsl modems) etc. As shown, a first station 1330 is configured for communication with a second station 1334. The first station 1330 and second station 1334 communicate via one or more channels 1312. The first transceiver 1330 connects to the channel 212 via an interface 244. The interface 244 is configured to isolate the incoming and outgoing signals.

The channel 1312 may comprise one conductor or path or more than one conductor or path, and hence the interface 1344 may perform isolation for each channel based on direction of data flow. The channel may comprise any medium or path. The receive module 1338 and transmit module 1342 may comprise any assembly of hardware, software, or both configured to operate in accordance with the principles described herein.

The receive module 1338 and transmit module 1342 communicate with a processor 1346. The processor 1346 may include or communicate with a memory 1350. The processor operates as described below in more detail and as would be understood by one of ordinary skill in the art. The memory 1350 may comprise but is not limited to, one or more of the following types of memory: RAM, ROM, hard disk drive, flash memory, or EPROM. The processor 1346 may be configured to perform one or more calculations or signal analysis as describe above or as would be contemplated by one of ordinary skill in the art. In one embodiment, the processor 1346 is configured to execute machine readable code stored on the memory 1350. The processor 1346 may perform additional signal processing tasks as described herein. For example, the processor may store a variety of data regarding signal to noise ratio (SNR) or other system parameters in the memory. The SNR or other system parameters may correspond to different symbol rates or constellation sizes for a given maximum transmit power or other session limitations. The term session limitation is defined to mean an aspect of system operation that must be followed or that system operation is constrained by.

The second transceiver 1334 is configured similarly to the first transceiver 1330. The second transceiver 1334 comprises an interface 1352 connected to a receiver module 1356 and a transmitter module 1360. The receiver module 1356 and a transmitter module 1360 communicate with a processor 1364, which in turn connects to a memory 1368. Operation occurs as described herein.

Figure 14:
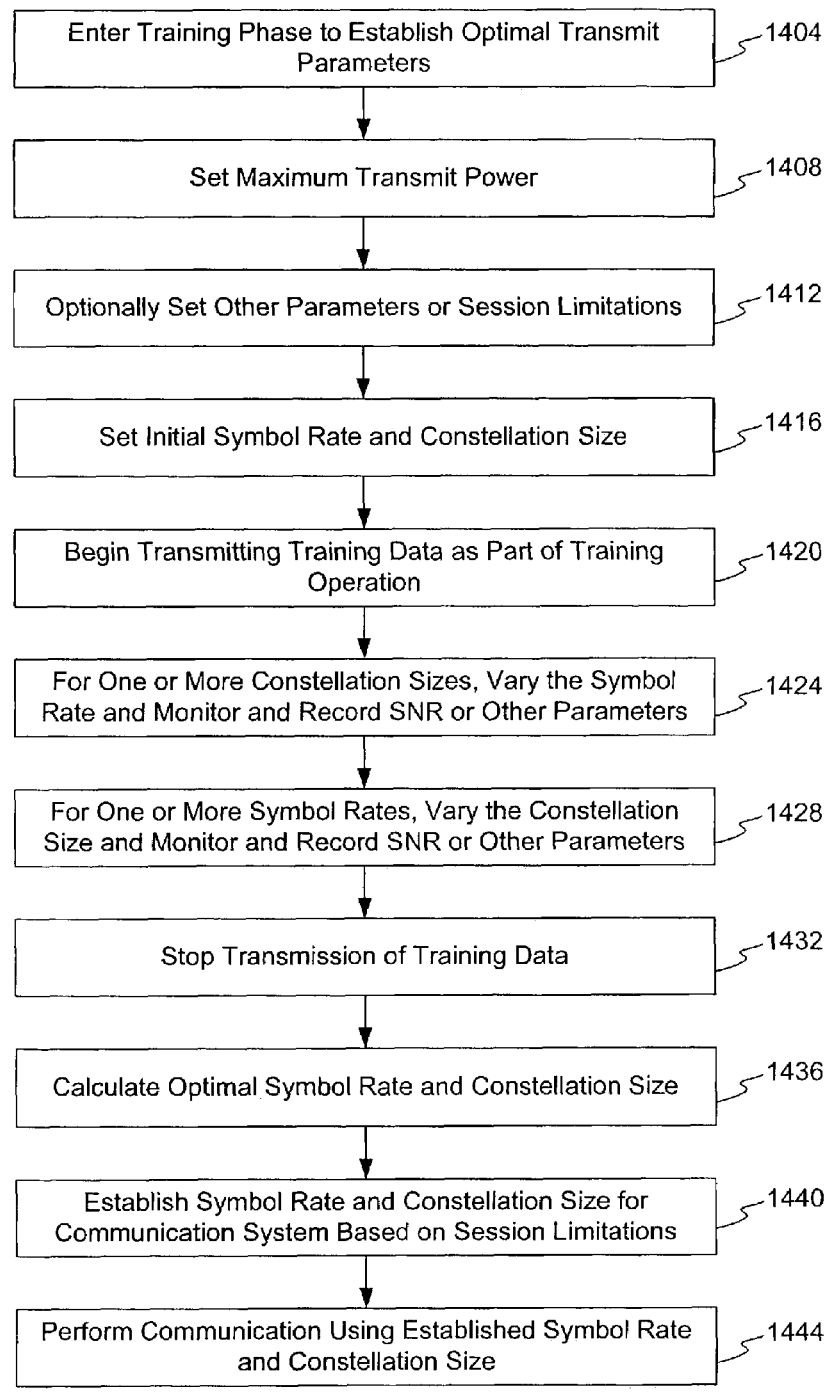
FIG. 14 illustrates an operational flow diagram of an example method of operation.

FIG. 14 illustrates an operational flow diagram of an exemplary general method of operation. Various methods of operation are contemplated and that shown in FIG. 14 is but one possible example embodiment. Other methods of operation discussed herein provide more detailed description than that shown in FIG. 14. In generally, this method utilizes a training operation to determine an optimal symbol rate setting and constellation size setting for a particular communication system while complying with one or more communication system limitations or session limitations. It is contemplated that this training may occur during the design and engineering phase, during the install phase at the time of first use, at the initiation of each communication session, or periodically during operation, such as for example during idle periods.

It is contemplated that by utilizing the invention described herein, the bit rate may be interdependent on the symbol rate, the constellation size, and possibly one or more other parameters, all of which may be modified Turning now to FIG. 14, at a step 1404, a communication system enters a training phase. In one embodiment the training phase occur at a time other than during active communication of user data, however, it is contemplated that the training phase may occur during active communication of user data by simply transmitting user data to instead of test or training data.

At a step 1408, the communication system or training module, which may comprise hardware or software, or a combination of both, is programmed with the maximum transmit power. This may be fixed by governmental regulation, system or channel limitations, or may be input by a user or technician. As can be understood, a system may have transmit power limitations due to regional regulatory restrictions, hardware limitations or to reduce crosstalk and echo. At a step 1412, additional transmit parameters or session limitations may be established or read from memory. A session limitation comprises any limitation upon communication system operation that should be complied with.

Next, at a step 1416, an initial symbol rate and constellation size are established. This may be considered the starting point from which training occurs. Any initial symbol rate and constellation size may be selected. At a step 1420 the training operation begins transmitting training data or any other type of data as part of the training operation. It is contemplated that this data is transmitted and monitored to determine optimal settings for the communication systems. In contrast to prior art systems that may have utilized training to establish filter coefficients, the method and apparatus described herein establishes a symbol rate, a constellation size, or both.

At a step 1424, the system varies the symbol rate and monitors and records the SNR, or other parameters, for one or more constellations sizes. Thus, in one embodiment the system maintains the constellation size constant while transmitting data at different symbol rates. Then, at a step 1428, the system may vary the constellation size and monitor and record the SNR or other system parameters, for each of one or more symbol rates.

Through the operation of steps 1424 and 1428, a set of data is generated regarding system operation, such as for example, the SNR, for numerous combinations of and permutations of symbol rate and constellation size. It is contemplated that other parameters, such as the duration of each training session and/or the number of training sessions, may be varied. Any symbol rate and constellation size, within the capability of the communication system, may be utilized during training to generate the training data.

At a step 1432 the training operation stops transmitting the training data and at step 1436 the training operation calculates the optimal symbol rate and constellation size given the system parameters, system limitations or session limitations. In one embodiment the optimal symbol rate and constellation size are the symbol rate and constellation size that yield the best SNR. In one embodiment the optimal symbol rate and constellation size are the symbol rate and constellation size that yield the highest bit transmit rate. In one embodiment the optimal symbol rate and constellation size are the symbol rate and constellation size that yield the highest bit transmit rate while maintaining the lowest SNR. In one embodiment a processor, controller, DSP, ASIC, or FPGA performs the processing to determine the SNR, or the optimal symbol rate and/or constellation size.

Next, at a step 1440, the communication system established the desired or optimal symbol rate and constellation size calculated in step 1436 as the symbol rate and constellation size to be used during a communication session by one or more communication devices. At a step 1444, the communication device performs communication utilizing the symbol rates and the constellation size, or any other operational parameter established at a step 1440. This may be considered the optimal settings or the settings may be established based on any parameters desired.

It is contemplated that this training operation may occur within each communication device in a multiple communication device system since the channel characteristics may not be identical in both directions. It is also contemplated this training operation may be also used to determine receiver equalization settings.

The following discussion and figures provide more detail discussion of the various example embodiments. Returning now to FIG. 1, shown is a block diagram of a communication system 100. The system 100 could be located at a central office (may also be referred to as "local") station (or site) or at a remote station (may also be referred to as "customer premise equipment" site ("CPE")).

The system 100 has a transmit path that comprises components 101, 102, 103, 107 and 108 (as described below) and is referred to as a "transmitter" or a "modulator". The system 100 also has a receive path that comprises components 108, 111, 112, 113, 116, 118, 120 and 122 (as described below) and is referred to as a "receiver" or a demodulator. Since the system 100 comprises of a modulator and a demodulator, it is commonly referred to as a "modem terminal".

The system 100 in the transmit path uses a PAM encoder 102 that receives input digital bit stream 10A via a scrambler 101. The PAM encoder 102 modulates digital bit stream 101A and generates a signal 102A that is sent to a transmission (Tx) filter 103. The signal 102A is spectrally shaped by the Tx filter 103 and then sent to a line driver/digital to analog (D/A) converter 105 which converts the digital signal 106 into an analog signal Tx 107.

The analog signal 107 is sent to a hybrid module 108 that routes the transmit signal 107 to a two-wire twisted pair telephone network with some leakage (echo) 107A to the receiver path. Useful Tx signal 107B is sent to a remote site (not shown). The signal 107C is the reflection (or echo) resulting from impedance mismatch when the Tx signal 107B is sent from the central station to the remote station.

The hybrid module 108 is commonly used for full-duplex data communications on two-wire twisted pair lines. For efficient performance, high-speed modems suppress the echo to below background noise level. The echo occurs due to imperfect impedance match in the hybrid module 108. A digital echo canceller 114 cancels the linear echo due to leakage 107A and 107C.

In the receive path, a signal Rx 109 enters the hybrid module 108 that generates the signal 110 and sends the signal 110 to an analog to digital (A/D) converter 111 that sends a digital signal 111A to a receive (Rx) filter 112. The Rx filter 112 removes any outband noise and reshapes the received signal spectrum. Then the echo estimate 125 is subtracted from the output 112A of the Rx filter 112 to generate a signal 115. The signal 115 is then sent to a FFE 116 that sends the signal 117 to a decimator 118. The signals 111A, 112A, 115 and 117 are normally over sampled by a factor of 2 times the symbol rate (e.g. at 2/T where T is the symbol period). The decimator 118 decimates the signal 117 to symbol rate (e.g. at 1/T) and generates a signal 118A which is further equalized by a DFE 120. The output of a DFE subtractor 121 is sent to a decision device (detector) 122, to generate an output 123. The decision device 122 may comprise a symbol-by-symbol PAM slicer or a Viterbi decoder for TCM coded PAM signals.

Figure 1:
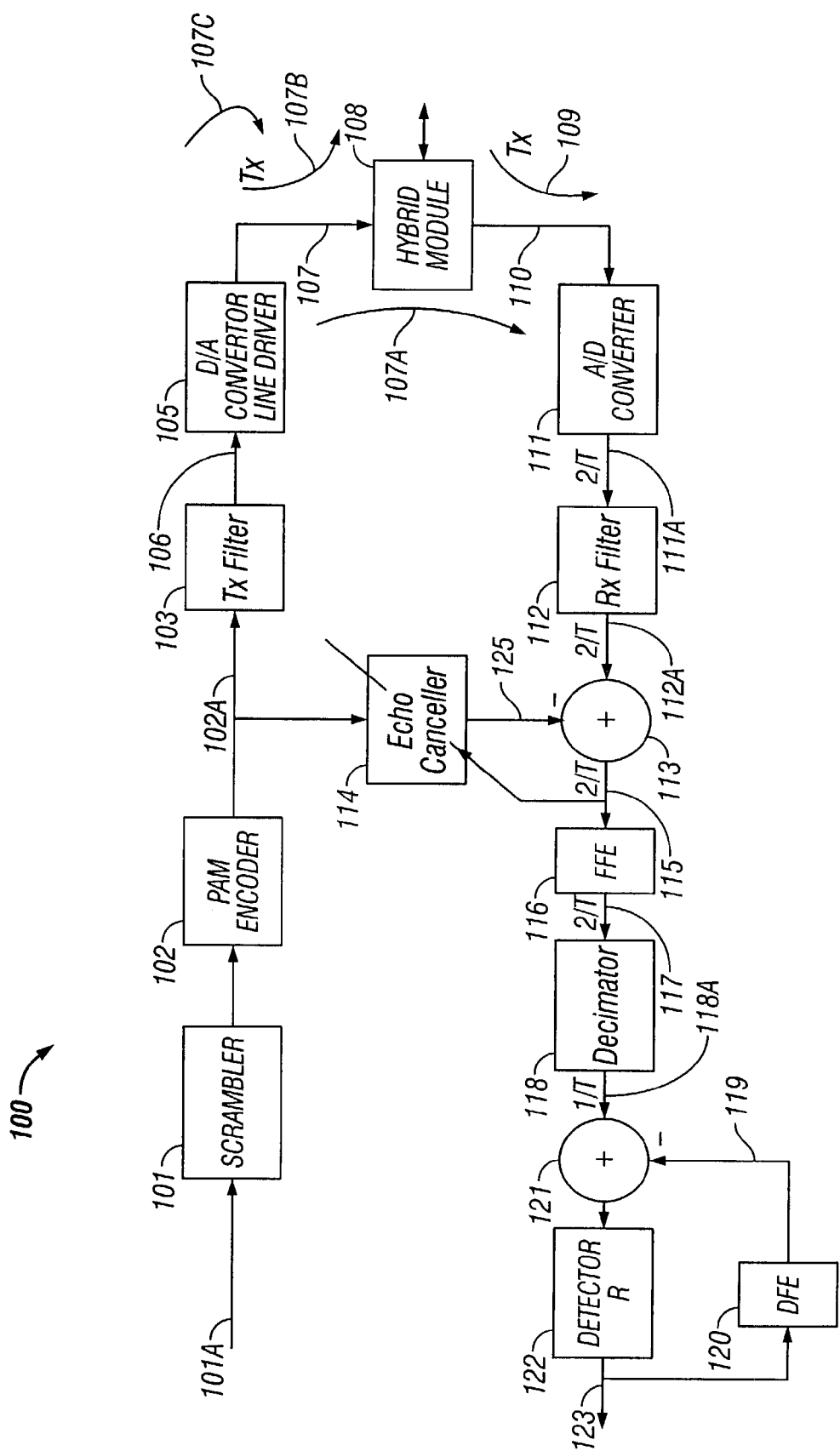
FIG. 1 shows a block diagram of a communication system using the adaptive aspects of the present invention.
Figure 2:
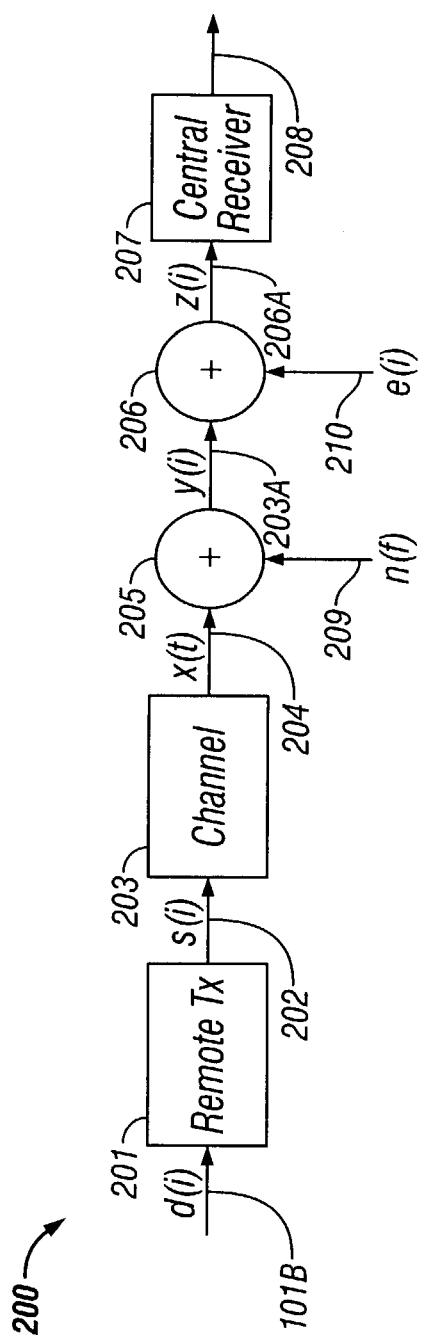
FIG. 2 shows a block diagram of a simplified block diagram with various components of FIG. 1 for using the adaptive aspects of the present invention.

FIG. 2 shows a top-level block diagram of a simplified channel model used in a communication system (e.g. system 100), according to one aspect of the present invention. A signal (d(i) where i is the symbol index) 101B is processed by a transmit segment 201 (described above with respect to FIG. 1) for a remote site. The output of Tx 201 is shown as s(i) (with its power spectral density, S(f) 202A) 202, which is sent to channel 203. Channel 203's impulse response maybe designated as h(t) or H(f) in frequency domain). A channel 203 generates x(t) 204 and the PSD of x(t) 204 is given by $|X(f)|^2 = S(f)|H(f)|^2$.

Additive noise n(t)(its PSD is designated as N(f) 209A) 209 comprises of additive white Gaussian noise and crosstalk from adjacent twisted pairs is added at 205.

Residual echo e(i) 210 (its PSD is designated as E(f) 210A) after digital echo cancellation is sampled at logic 206. A receiver module 207 includes the components in the receive path of a system 100 as discussed above with respect to FIG. 1.

Determining $R_{opt}$:

The following describes the technical and mathematical process of achieving a maximum bit rate with optimal symbol rate and constellation size without significant penalties in power, with respect to the block diagrams of FIGS. 1–2. The variable $R_{opt}$ represents the optimum bit rate.

If the maximum symbol rate is denoted as $f_{sym-max}$ (in G.shdsl its' value is given by $f_{sym-max} = 2360/3 = 786.667$ kbaud), symbol rate increment is denoted by $\Delta f_{sym}$ (in G.shdsl $\Delta f_{sym} = 8/3$ kbaud) and $f_{sym,k} = k\Delta f_{sym}$, $k=1, 2, \ldots, K$ where $K = \lfloor f_{sym-max}/\Delta f_{sym} \rfloor$ and $f_{sym-max} = f_{sym,K}$ for simplicity and $\Delta f_{sym}$ may be further divided into L frequency bins, then given the discrete form of the MSE DFE signals, $SNR_{dB}(k)$ for the $k^{th}$ symbol rate may be given by:

$$SNR_{dB}(k) = \frac{1}{kL}\sum_{i=1}^{kL} 10\log_{10}\left(1 + \frac{S_k(f_i)|H(f_i)|^2}{N(f_i) + E_k(f_i)} + \frac{S_k(f_{sym,k} - f_i)|H(f_{sym,k} - f_i)|^2}{N(f_{sym,k} - f_i) + E_k(f_{sym,k} - f_i)}\right) \quad (I)$$

where $S_k(f)$ 202A is the nominal far-end transmit signal power spectral density for the $k^{th}$ symbol rate, $|H(f)|^2$ is the magnitude squared of the ideal loop gain function (H(f)), N(f) 209A is the cross-talk noise power spectral density, $E_k(f)$ 210A is the residual echo power spectral density for the $k^{th}$ symbol rate and $f_{sym,k}$ is the transmit symbol rate. It is noteworthy that a receiver is assumed to have a 2/T FFE front-end in the above $SNR_{dB}(k)$ formula.

For un-coded M-ary PAM, exemplary minimum SNRs values for BER<1e−7 are provided in Table 1 below, where M is the constellation size:

TABLE 1

SNRs for BER = 1e-7

| M | 2 | 4 | 8 | 16 | 32 | 64 | 128 | 256 | 512 | 1024 |
|---|---|---|---|---|---|---|---|---|---|---|
| SNR(dB) | 11.3 | 18.4 | 24.7 | 30.8 | 36.8 | 42.9 | 48.9 | 54.9 | 60.9 | 67.0 |

For TCM-PAM systems, the SNR for a particular M is reduced by the applicable coding gain. From Table 1 it can be inferred that each additional bit/symbol increase requires about 6 dB additional SNR. If M is reduced to any integer number, then additional SNR for constellation size increases from M to M+1, which is less than 6 dB and fractional bits per symbol.

It is noteworthy that fractional bit per symbols can be achieved by any frame-based mapping methods such as multiple-modulus conversion (MMC), or shell mapping. The higher the bit/symbol resolution, the larger the frame size and longer the latency.

Based on the MSE-DFE SNR relationship given above, $|X_k(f)|^2 = S_k(f)|H(f)|^2$, N(f) and $E_k(f)$ can be accurately estimated during channel line probing/ranging session, and a relationship between SNRs and various symbol rates $f_{sym,k}$ may be constructed. This data may be stored in a memory and/or processed to determine optimal settings. From the SNR(k)-$f_{sym,k}$ relationship and the required SNR for a particular M size (illustrated in Table 1 as an example), an optimum achievable MSE-DFE SNR may be ascertained that achieves BER<1e-7. Then the maximum achievable bit rate for a symbol rate, e.g., $R_k = f_{sym,k} \times \log_2(M_k)$ kbps can be determined, and thereafter the optimum bit rate, designated as $R_{opt}$ may be determined, as described below with respect to FIGS. 14, 3 and 4.

FIG. 3 shows a flow diagram for determining $R_k$, according to one aspect of the present invention. Turning in detail to FIG. 3, the process starts in step S300.

In step S301, the process starts for the first symbol rate, i.e., k=1. The k value may be set to any value, but it is contemplated that k is varied during the process of determining optimum values.

In step S302, the modem terminal is configured to the kth symbol rate. As is well known in the art, this step requires that the clock signal for the modem terminal be configured to the appropriate symbol rate.

In step S303, the process estimates N(f) 209A, as described below in detail. N(f) represents noise power spectral density, which may also be considered to be noise.

In step S304, the process estimates $|X_k(f)|^2 = S_k(f)|H(f)|^2$.

In step S305, the process estimates $E_k(f)$, as described below. $E_k(f)$ represents residual echo power spectral density which may also be considered echo.

In step S306, the process determines the SNR value for the kth symbol rate. In one aspect this value is determined by using Equation I described above.

In step S307, the process moves to the next symbol rate, i.e. k+1 and in step S308, the process determines if the last symbol rate is reached. If the last symbol rate is not reached, the process moves back to step S302.

If the last symbol rate is reached, then in step S309, the optimum rate is determined (described in FIG. 4), and the process stops in step S310.

FIG. 4 shows a flow diagram for determining the optimum bit rate $R_{opt}$ as is discussed in step S309 in FIG. 3. Turning in detail to FIG. 4, the process starts in step S400. In step S401, $R_{opt}$ is initialized to zero and k is set to 1.

In step S402, the process determines the constellation size (M) for the kth symbol rate. This is determined mathematically as follows: After determining SNR(k) (step S306), the effective SNR $\gamma_{eff}(k)$ is determined by:

$$\gamma_{eff}(k) = SNR(k) - \Gamma + \gamma_c$$

where $\Gamma$ is the predefined noise margin and $\gamma_c$ is the applicable coding gain if TCM is employed. The bit error rate for M-ary PAM is described in *Digital Communications*, John Proakis, 3$^{rd}$ Edition, Published by McGraw-Hill, 1995, incorporated herein by reference in its entirety, and is determined by:

$$P_{PAM}(\gamma_{eff}(k), M_k) = \frac{2(M_k - 1)}{M_k} Q\left(\sqrt{\frac{6 \times \gamma_{eff}(k)}{(M_k^2 - 1)}}\right).$$

After determining $\gamma_{eff}(k)$, the following provides the value for $M_k$ $$P_{PAM}(\gamma_{eff}(k), M_k) = \frac{2(M_k - 1)}{M_k} Q\left(\sqrt{\frac{6 \times \gamma_{eff}(k)}{(M_k^2 - 1)}}\right) = 10^{-7}$$

In step S403, the process converts $M_k$ to the bit rate for the kth symbol, designated as $R_k$. The bit rate for the k$^{th}$ symbol rate is given by:

$$R_k = f_{sym,k} \times \log_2(M_k).$$

In step S404 the value for $R_{opt}$ is compared to $R_k$. If $R_{opt} < R_k$ is not true then $R_k$ is discarded and the process moves to step S406, where the value of k is incremented by 1 (for the next symbol rate) and the process moves to step S402. If $R_{opt} < R_k$ is true, then in step S405, the process replaces the potential candidate $R_{opt}$ with $R_k$ and saves $f_{sym,opt} = f_{sym,k}$ and the process moves to Step S406.

In step S407, the process determines if the last symbol rate has been reached. If the last symbol rate has been reached then the process stops at step S408, otherwise, the process steps S402 through S407 are repeated.

The foregoing process steps of FIGS. 3 and 4 may be repeated for all possible symbol rates i.e., $f_{sym,k}$, k=1, 2, . . . , K to determine the optimal symbol rate with matching constellation size that achieves the maximum bit rate for a given average power limit and maximum bandwidth. In other embodiments other optimal communication device settings may be calculated with one or more other settings held constant or constrained.

Figure 5:
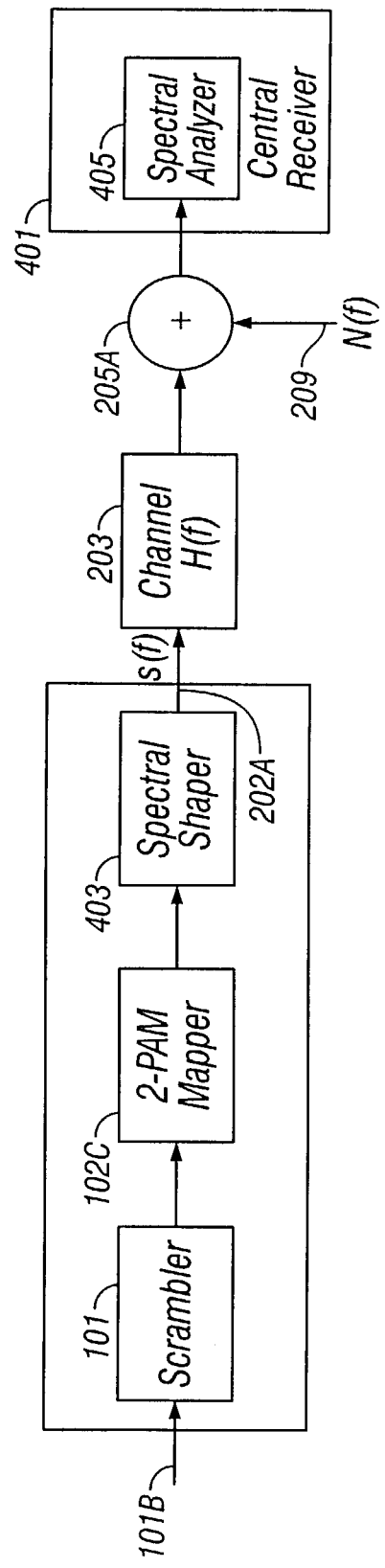
FIG. 5 shows a simplified block diagram with a spectral analyzer, used for measuring plural parameters for data rate optimization, according to one aspect of the present invention.

Estimating N(f) and $|X_k(f)|^2$:

FIG. 5 shows a block diagram of a remote transmitter 400 (similar to the transmitter shown in FIG. 1) and a central site receiver 401 (also shown in FIG. 1), for determining N(f) 209A and $|X_k(f)|^2$ which is equal to $|S(f)|H(f)|^2$. Spectral shaper 403 includes a Tx filter 103, and a line driver/D/A converter 105 (FIG. 1), while the receiver 401 includes Rx filter 112 and A/D converter 111.

To measure N(f) 209A, Tx from a remote site may be turned off (or de-activated) such that S(f) 202A becomes 0 and then N(f) 209A is determined. $|X_k(f)|^2$ is determined by turning on (or activating) remote Tx and then measured by spectral analyzer 405. This may occur as part of the training process.

It is noteworthy that although the foregoing has been illustrated by activating signals at the remote/central sites, the invention is not limited to the sites itself. For example, either the remote or central site may be used to measure the foregoing values.

Figure 6:
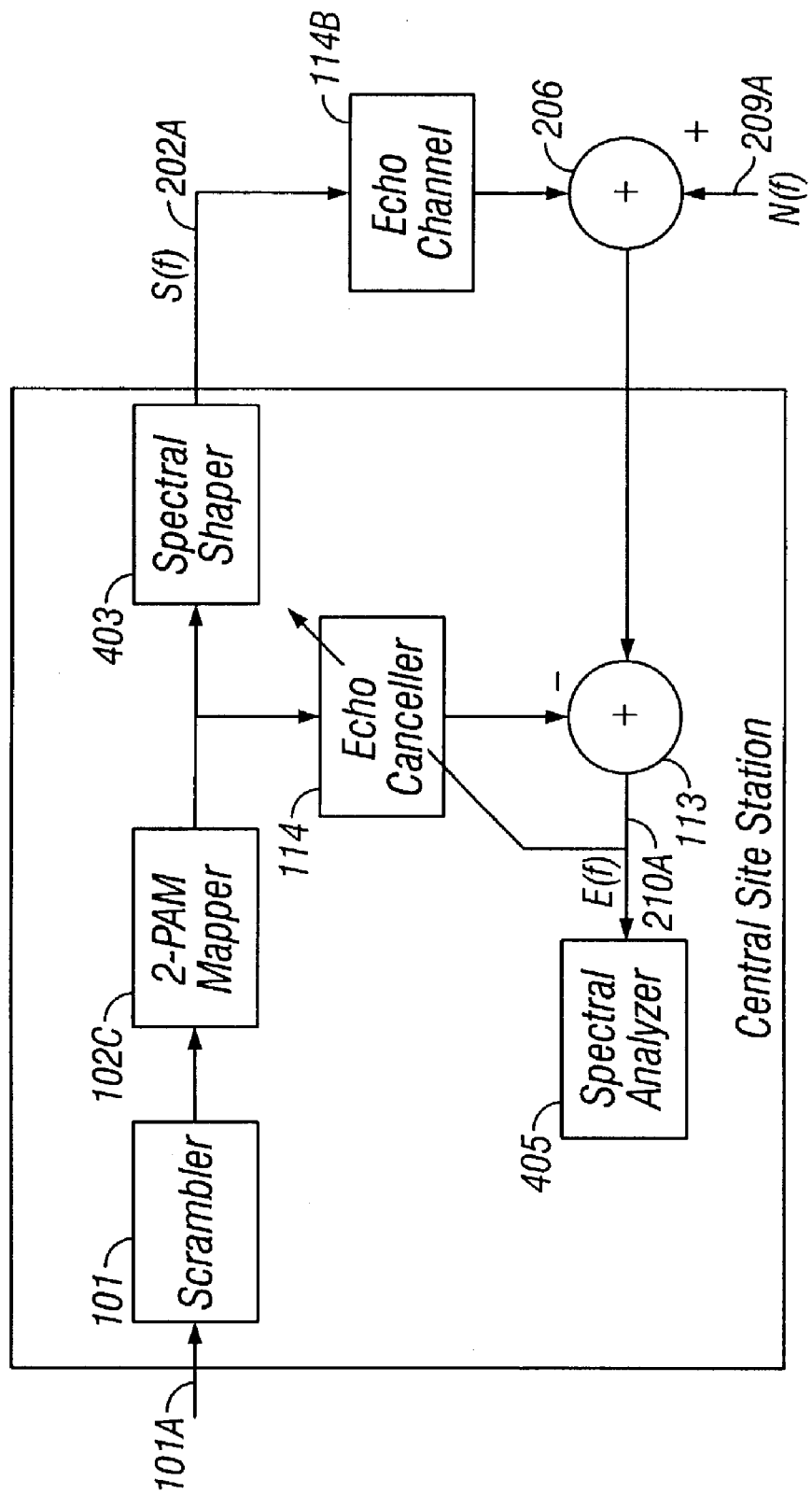
FIG. 6 shows a simplified block diagram with a spectral analyzer for measuring echo, according to one aspect of the present invention.
Figure 7:
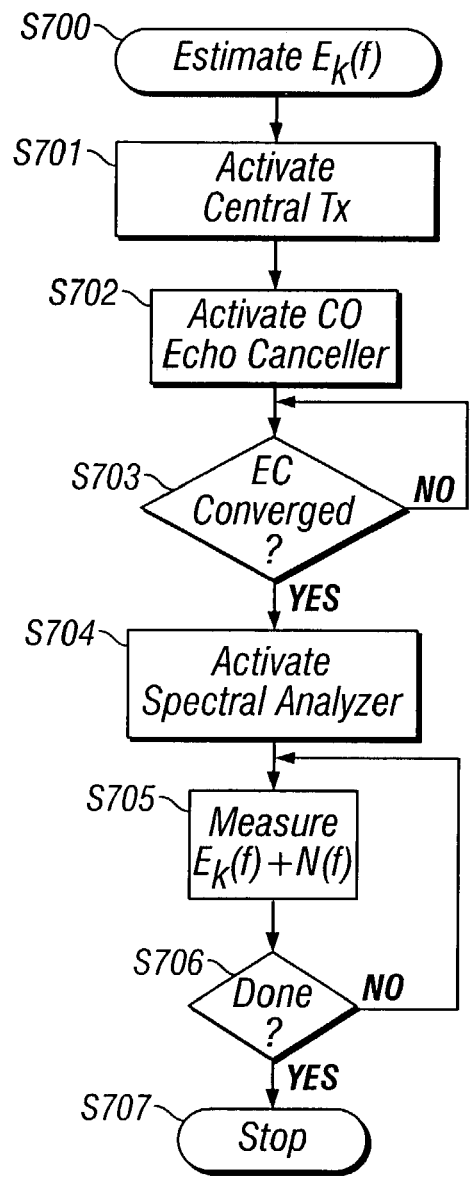
FIG. 7 shows a flow diagram of process steps for measuring echo, according to one aspect of the present invention.

FIG. 6 shows a block diagram of a system for determining $E_k(f)$, according to one aspect of the present invention. FIG. 6 shows an echo channel 114B that is used to determine the echo resulting from the signals 107A and 107C. The echo channel includes various components that have been shown in FIG. 1, for example, the modules 103, 105, 108, 111 and 112. The process steps used by the echo channel 114B will now be described with respect to FIG. 7. The process of echo cancellation is known in the art and hence the system of FIG. 6 is not discussed in great detail. Through monitoring and calculation of the echo on the line, optimal communication device settings may be determined, as discussed herein.

The process starts in step S700. In step S701, the central (or local) station ("CO") transmit side is activated.

In step S702, echo-canceller ("EC") 114 is activated and in step S703 the process determines if EC 114 is converged.

If the EC 114 has not been converged then the process waits until EC 114 is converged. If the EC 114 is converged, then in step S704, the spectral analyzer 405 is activated.

In step S705, $E_k(f)+N(f)$ is measured and the process determines in step S706 if all the symbol rates are completed. If they are completed, then in step S707, the process stops, otherwise, the process goes back to step S705.

Figure 8:
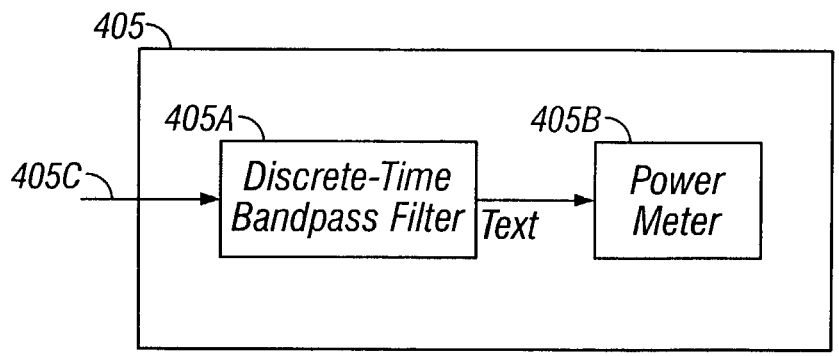
FIG. 8 shows a block diagram of a power spectral analyzer used according to one aspect of the present invention.

FIG. 8 shows an example of a block diagram of a spectral analyzer 405. The spectral analyzer 405 includes a discrete-time band-pass filter 405A and a power meter 405B. The filter 405A receives the output from a receiver and provides a fixed bandwidth and adjustable center frequency to analyze the signal. Although the spectral analyzer 405 can be implemented with a discrete Fourier transform (DFT) front-end followed by a power meter, an alternative implementation may use a FIR filter such as a FFE filter engine 116 (FIG. 1).

Figure 9:
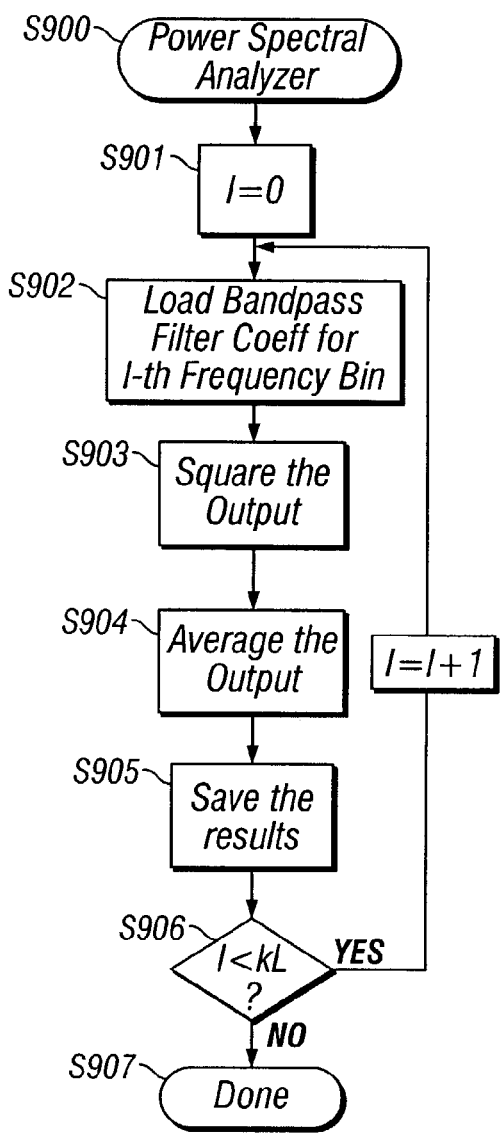
FIG. 9 shows a flow diagram for the power spectral analyzer used according to one aspect of the present invention.

FIG. 9 shows a flow diagram of FFE implementation used by the spectral analyzer 405. Turning in detail to FIG. 9, in step S900 the process starts and in step S901, the frequency bin index value is set to zero.

In step S902, band-pass filter coefficients are loaded, for example, one at a time for the lth frequency bin.

In step S903, the output of the FFE is squared and then averaged to obtain an average power reading in step S904. The results are saved in step S904.

In step S906, if l is not less than kL (the number of bins to be measured for the kth symbol rate), then the process stops in step S907. If l is less than kL, then the process is repeated from step S902, by increasing the value of l to l+1.

Applications to G.shdsl (G.991.2) Standard:

In practice, it is not efficient to estimate the foregoing channel parameters (i.e., $|X_k(f)|^2$ and $E_k(f)|$) for every possible symbol rate. In fact, $$|X_k(f)|^2 = \frac{S_k(f)|X_K(f)|^2}{S_K(f)}, E_k(f) = \frac{S_k(f)E_K(f)}{S_K(f)}$$

and $S_k(f)$ are well defined in the G.991.2 recommendation. Therefore, in one aspect of the present invention, $|X_k(f)|^2$, $E_k(f)$ and N(f) are estimated only for the highest symbol rate (i.e., k=K) and SNR(k) is determined as follows:

$$SNR_{dB}(k) = \frac{1}{kL}\sum_{i=1}^{kL} 10\log_{10}\left(\frac{1 + \frac{S_k(f_i)|X_K(f_i)|^2}{S_K(f_i)N(f_i) + S_k(f_i)E_K(f_i)} +}{\frac{S_k(f_{sym,k} - f_i)|X_K(f_{sym,k} - f_i)|^2}{S_K(f_{sym,k} - f_i)N(f_{sym,k} - f_i) + S_k(f_{sym,k} - f_i)E_K(f_{sym,k} - f_i)}}\right)$$

Figure 10:
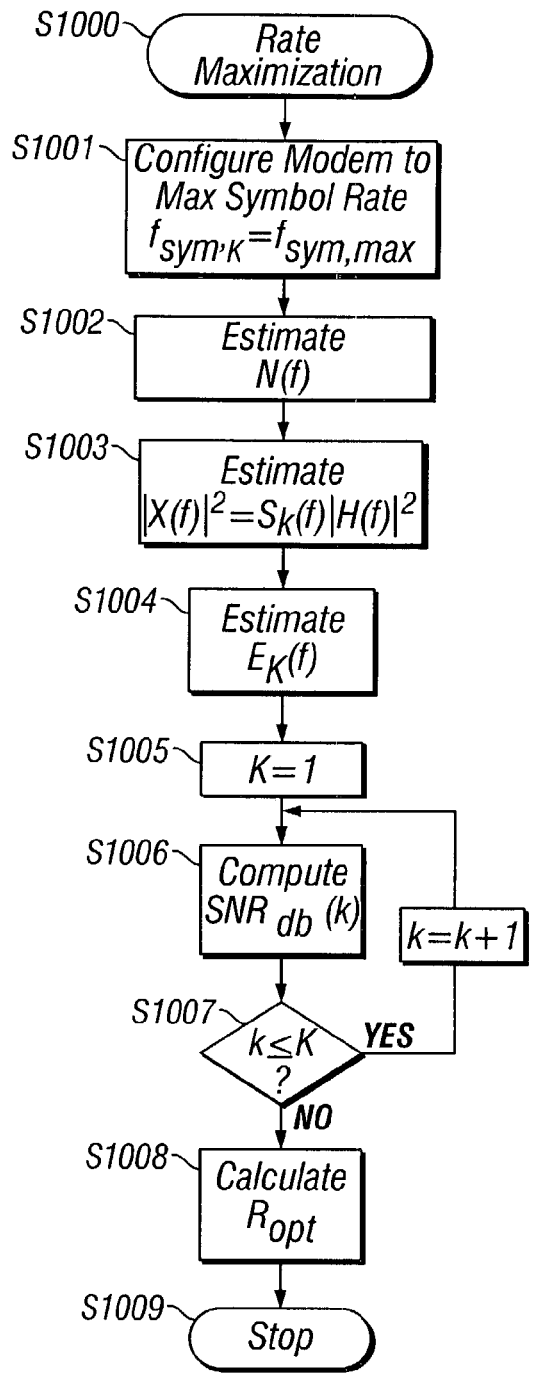
FIG. 10 shows a flow diagram for determining maximum data rate, according to one aspect of the present invention.

FIG. 10 shows a flow diagram for data rate maximization that minimizes the amount of line probing in a communication system, according to one aspect of the present invention. Turning in detail to FIG. 10, the process starts in step S1000.

In step S1001, the modem (system 100 of FIG. 1) is configured for maximum symbol rate.

In step S1002, N(f) 209A is estimated for the maximum symbol rate. In step S1003, $|X_K(f)|^2$ is estimated for the maximum symbol rate $f_{sym,K}=f_{sym-max}$.

In step S1004, the value of $E_K(f)$ 210A is estimated for the maximum symbol rate. In step 1005, the value of k is set to one.

In step S1006, $SNR_{dB}(k)$ is determined, as described above. This value is computed until the last symbol rate is reached in step S1007. Thereafter, in step S1008, $R_{opt}$ is determined, as described in FIG. 4.

In step S1009, the process stops. It is contemplated that methods other than those described in FIG. 10 may be enabled without departing from the scope of the claims that follow.

Figure 11:
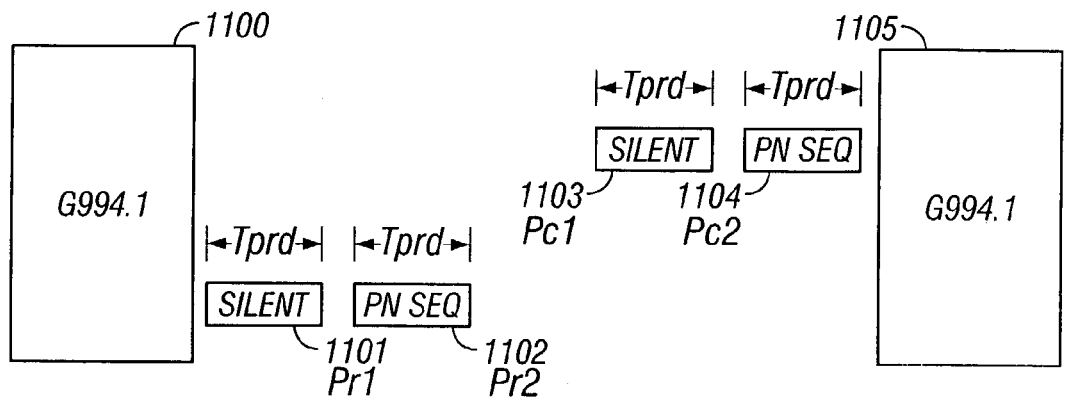
FIG. 11 shows an example of a timing diagram for a pre-activation sequence, according to one aspect of the present invention.

FIG. 11 shows a timing diagram for using the foregoing process steps during line probing. G.shdsl allows line probing before data is transferred between a remote and locate site. This process is also called pre-activation. The standard allows a "handshake" for exchange of parameters between a central and remote site.

FIG. 11 shows a central site line probing as Pc1 1103 and Pc2 1104 with time period Tpcd. During Pc1 1103, Tx signal 107 from central site is deactivated.

Line probing Pr1 1101 and Pr2 11102 with time period Tprd are at the remote site. During time period 1101, Tx signal from a remote site is deactivated.

During the silent period 1103, N(f) 209A can be determined, as discussed above.

Figure 12A:
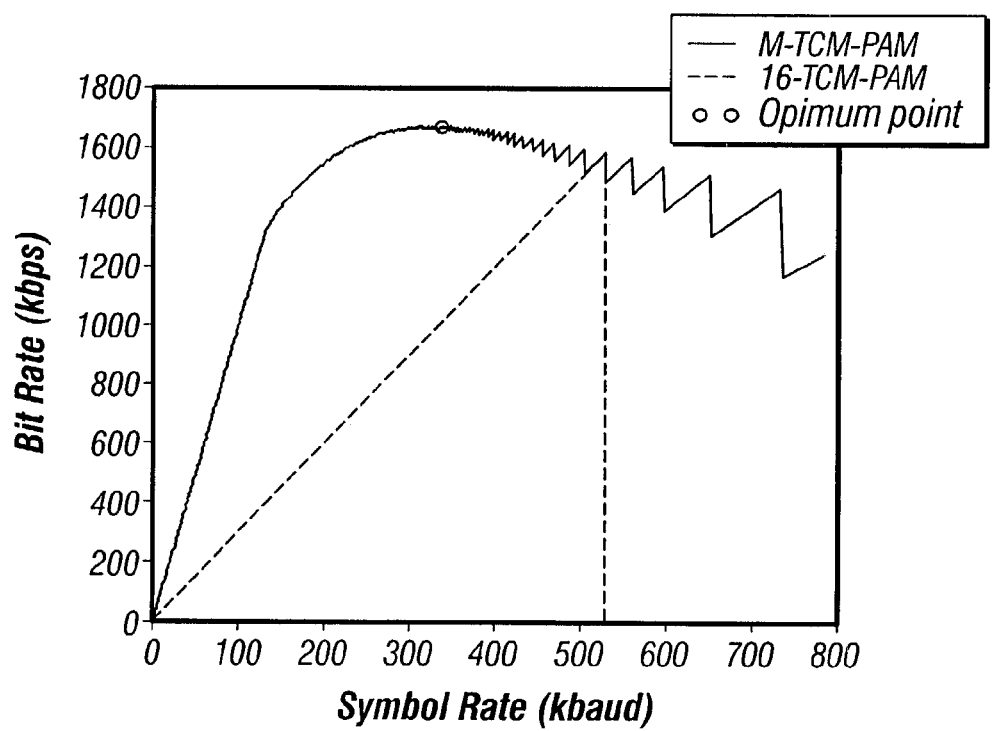
FIGS. 12A–12C graphically illustrate case studies using the adaptive aspects of the present invention.
Figure 12B:
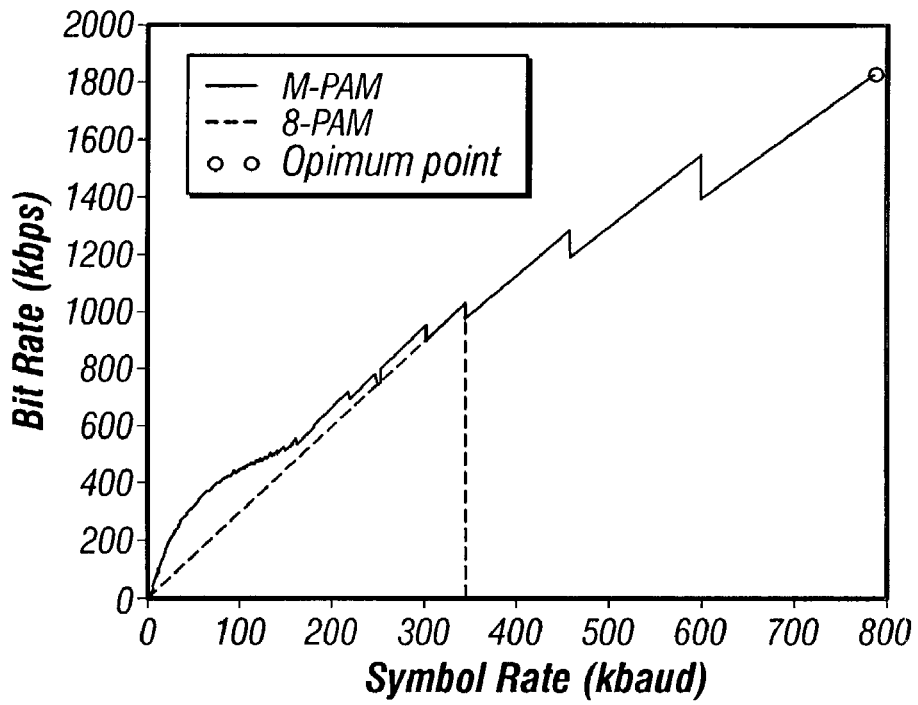
Figure 12C:
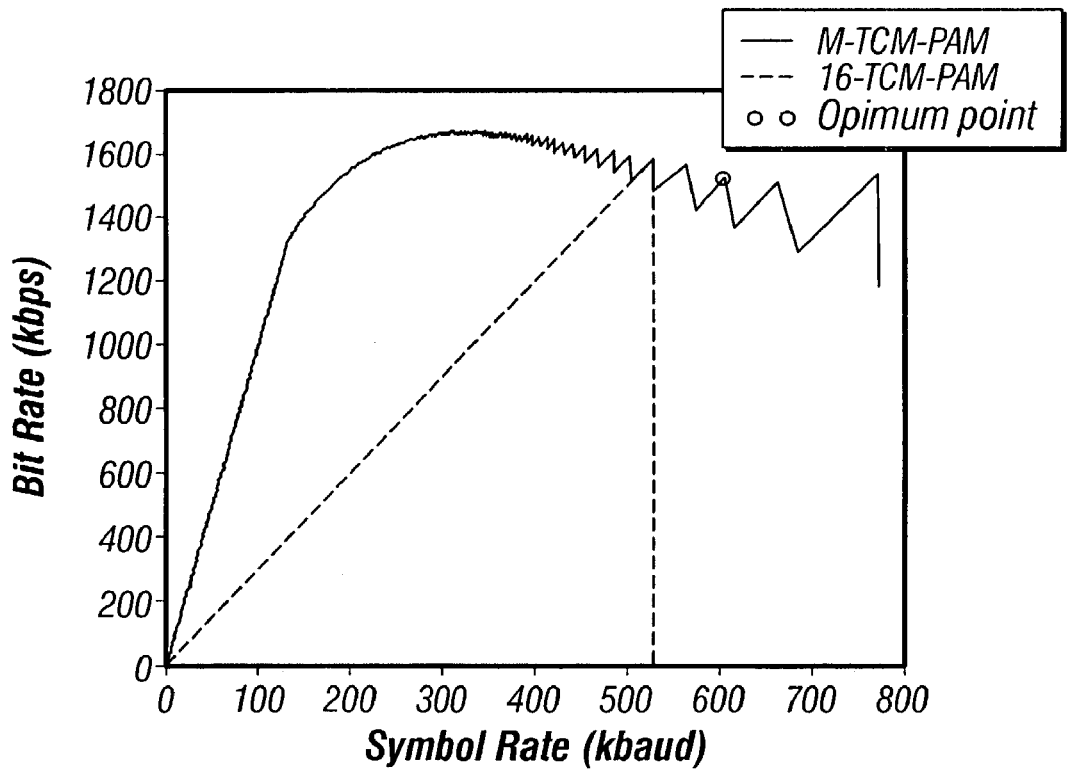

Case Studies:

FIGS. 12A–12C show three case studies using the foregoing process steps, according to the adaptive aspects of the present invention.

FIG. 12A shows that the optimum achievable rate is 1675 kbps (5 bits/symbol) and maximum achievable rate with 16-TCM-PAM (3 bits/symbol) is 1584 kbps (5.7% improvement).

FIG. 12B shows that the optimum rate is achieved by $f_{sym,k}$=786 kHz, M=5 (or 2.3219 bits/symbol) compared to $f_{sym,k}$=380 kHz, M=8. For this particular case, a combination of lower constellation and wider bandwidth is required to achieve higher rates. The rate difference is 1.825 Mbps v.s 1.035 Mbps (76% improvement). This demonstrates that fixing either symbol rate or constellation is not optimum in terms of total achievable data rate.

FIG. 12C shows that the optimum achievable rate is slightly higher than that of 16-TCM-PAM. 16-TCM-PAM is near-optimum for most DSL loops contaminated by AWGN. But it is not optimum when frequency-dependent crosstalk (NEXT and FEXT) are predominant noise sources.

It is noteworthy that the foregoing case studies have been used to illustrate the various adaptive aspects of the present invention and are not intended to limit the scope of the invention.

In one aspect of the present invention, a maximum bit rate is achieved with optimal symbol rate and constellation size without significant penalties in power.

In another aspect, the process of the given system operates efficiently for both v.90/V.92 and G.shdsl standards.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed:

1. A method for optimizing data rate in a communication system, comprising:
    establishing a symbol rate and a constellation size for the communication system;
    transmitting data utilizing the symbol rate and the constellation size;
    establishing a first relationship between signal to noise ratio and the first symbol rates and the first constellation size;
    modifying one or more of the symbol rate and the constellation size to create a modified version of the symbol rate and the constellation size;
    transmitting data utilizing the modified version of the symbol rate and the constellation size;
    establishing a second relationship between signal to noise ratio and the modified version of symbol rate and the constellation size; and
    comparing the first relationship to the second relationship to determine an optimal data rate.

2. The method of claim 1, further comprising determining noise power spectral density (N(f)).

3. The method of claim 2, wherein N(f) is determined during a silent period of line probing.

4. The method of claim 2, further comprising determining a factor $X_k$ (f) based on a nominal front end transmit signal power spectral density for a kth symbol rate and an ideal loop gain function of a channel.

5. The method of claim 4, wherein $X_k$ (f) is determined by activating a remote transmit signal, after N(f) has been measured.

6. The method of claim 1, further comprising determining residual echo $E_k$ (f) for a kth symbol rate.

7. The method of claim 6, wherein $E_k$ (f) is determined by activating a central station echo canceller.

8. The method of claim 1, wherein the communication system uses digital subscriber lines (DSL).

9. The method of claim 1, further comprising receiving information regarding signal to noise ratio from a second station, the second station receiving the transmitted data.

10. A method for determining optimizing data rate in a digital communication system by monitoring noise power spectral density, comprising:
    deactivating a remote transmit signal;
    measuring noise power spectral density at a first time;
    adjusting one or more communication system parameters;
    measuring noise power spectral density at a second time; and
    establishing one or more communication system parameters based on the measuring of noise power spectral density at the first time and the second time.

11. The method of claim 10, further comprising activating the remote transmit signal and measuring $X_k$ (f).

12. The method of claim 10, wherein noise power spectral density is determined during a silent period of line probing.

13. The method of claim 10, wherein the one or more communication system parameters comprise one or more of constellation size and symbol rate.

14. A method for determining residual echo $E_k$ (f) when optimizing a digital communication system, comprising:
    establishing an initial symbol rate and an initial constellation size;
    activating a central station transmit signal;
    activating a central station echo canceller;
    measuring residual echo;
    modifying either or both of the symbol rate and the constellation size; and
    measuring residual echo.

15. The method of claim 14, wherein the method for determining residual echo is utilized to determine an optimal symbol rate and an optimal constellation size.

16. The method of claim 14, further comprising selecting either of the initial symbol rate or the modified symbol rate or either of the initial constellation size or the modified constellation size for use during a communication session.

17. A system for optimizing data rate in a digital communication system, comprising:
    a spectral analyzer that measures noise power spectral density during a silent period of line probing and, wherein the spectral analyzer measures $X_k$ (f), which is based on a nominal front end transmit signal power spectral density for a kth symbol rate and an ideal loop gain function of a channel after activating a remote transmit signal;
    an echo channel for measuring residual echo $E_k$ (f) for a kth symbol rate; and
    a processor configured to establish an optimal data rate based on the noise power spectral density and residual echo.

18. The system of claim 17, wherein the data rate is controlled by a symbol rate and a constellation size.

19. A system for optimizing communication system settings, comprising:
    a transmitter having one or more operational parameters, configured to transmit a signal;

a receiver configured to receive data, from a remote station, regarding the signal;
a memory;
a processor in communication with the memory, the processor configured to:
process the signal and the data to determine a first aspect of operation;
modify one or more operational parameters of the transmitter;
responsive to the modifying, process the signal and the data to determine a second aspect of operation; and
determine optimum operational parameters based on the processing of the signal and the data with two or more operational parameters.

20. The system of claim 19, wherein the operational parameters comprise symbol rate and constellation size.

21. The system of claim 19, wherein the memory is configured to store one or more operational parameter settings and one or more aspects of operation.

22. The system of claim 19, wherein one or more aspects of operation comprise aspects of operation selected from the group consisting of signal to noise ratio, echo, transmit power level, power spectral density, and crosstalk.

23. The system of claim 19, further comprising performing communication utilizing the optimum operational parameters.

* * * * *